United States Patent
Wojciak

(10) Patent No.: US 6,689,826 B2
(45) Date of Patent: Feb. 10, 2004

(54) CURABLE CYANOACRYLATE COMPOSITIONS AND METHOD OF DETECTING CURE

(75) Inventor: Stan Wojciak, New Britain, CT (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 10/050,710

(22) Filed: Jan. 18, 2002

(65) Prior Publication Data

US 2003/0065069 A1 Apr. 3, 2003

Related U.S. Application Data

(60) Provisional application No. 60/322,045, filed on Sep. 14, 2001.

(51) Int. Cl.[7] .............................. C08R 5/06; C08K 5/08
(52) U.S. Cl. ..................... 524/107; 524/555; 524/110; 524/358
(58) Field of Search ................. 324/107, 555, 324/110, 358

(56) References Cited

U.S. PATENT DOCUMENTS

| | | | |
|---|---|---|---|
| 4,581,427 A | 4/1986 | Dunn et al. | 526/147 |
| 5,302,627 A | 4/1994 | Field et al. | 522/13 |
| 6,017,983 A | 1/2000 | Gilleo | 523/442 |
| 6,312,644 B1 | 11/2001 | Moriarty et al. | 422/14 |
| 6,358,160 B1 * | 3/2002 | Winskowicz | 473/378 |
| 6,444,725 B1 | 9/2002 | Trom et al. | 523/118 |

OTHER PUBLICATIONS

V.V. Jarikov and D.C. Neckers, *Macromolecules*, 33, 7761–64 (2000).

* cited by examiner

*Primary Examiner*—Kriellion Sanders
(74) *Attorney, Agent, or Firm*—Steven C. Bauman

(57) ABSTRACT

Cyanoacrylate composition, having a cure indicator within the composition, is disclosed herein. The cyanoacrylate composition is "self-indicating" with respect to its ability to allow the end user to visually inspect the composition to determine whether, and the extent to which, cure has occurred. The composition includes a cyanoacrylate component, and a dye dissolved in the cyanoacrylate component. The cyanoacrylate composition has an initial color, oftentimes colorless or substantially so to the naked eye, and when cured, the cured cyanoacrylate composition has a different or second color. Observation of the second or different color is indicative that cure has occurred and the extent of the color change can be used to determine the degree of cure that has occurred.

24 Claims, No Drawings

US 6,689,826 B2

CURABLE CYANOACRYLATE COMPOSITIONS AND METHOD OF DETECTING CURE

RELATED U.S. APPLICATION DATA

This application is a continuation-in-part of U.S. Provisional Application No. 60/322,045, filed on Sep. 14, 2001, which is hereby expressly incorporated herein by reference in its entirety.

BACKGROUND OF THE INVENTION

Field of the Invention

This invention relates to cyanoacrylate compositions and methods of detecting cure of the cyanoacrylate compositions using luminescent dyes.

Brief Description of Related Technology

Cyanoacrylate adhesives are known for their fast adhesion and ability to bond a wide variety of substrates. They are marketed as "super glue" type adhesives. They are useful as an all-purpose adhesive since they are a single component adhesive, very economical as only a small amount will do, and generally do not require any equipment to effectuate curing. However, in some instances there is a tendency for adhesion failure to occur, particularly when the end user does not know when the adhesive has fully cured.

Fluorescing agents have previously been incorporated into curable compositions to provide a non-destructive method of inspection such as identifying cured films, and ensuring proper coating of the composition on an article. These fluorescing agents are typically used in UV/VIS (ultraviolet/visible) curable compositions. Most cyanoacrylate compositions do not require actinic radiation to effect cure.

Other dyes have been incorporated into polymeric compositions generally to color the composition rather than as a cure indicator as there is no color change associated therewith.

U.S. Pat. No. 6,017,983 (Gilleo) appears to refer to the use of a diazo dye that is believed to form a salt or complex with acid anhydrides, which acts as a color indicator for particular anhydride/epoxy resin thermoset adhesives. The resulting salt or complex is reported to produce a chromophoric shift in the dye which is indicative of the amount of acid anhydride present, and hence, the degree of cure. As the epoxy resin cures, the amount of acid anhydride diminishes thus producing a color change. This system appears to be limited to acid anhydride hardeners used to cure epoxy resins.

U.S. Pat. No. 5,302,627 (Field) reports the addition of a dye to UV radiation curable silicone-containing polymeric compositions that contain photoinitiators. Upon exposure to UV radiation, the silicone-containing polymeric composition undergoes a color change indicating that the composition has cured. The dyes used include an anthraquinone dye having a Color Index Solvent Blue 104, 1-hydroxy-4-[(methylphenyl)amino]-9,10-anthracenedione, and an azo dye mixture of azo benzene azo naphthyl benzene amine alkyl/alkoxy derivatives having a Color Index Solvent Blue 99, and azo benzene azo naphthyl benzene amine alkyl derivatives having a Color Index Solvent Red 166. Large amounts of the dye, greater than 30 ppm based on the weight of the composition, are reported to inhibit cure.

Notwithstanding the state of the technology, it would be desirable to provide a cyanoacrylate composition that has a built in method of detection or is "self-indicating" when cure has been achieved.

SUMMARY OF THE INVENTION

In a first aspect, the present invention is directed to a cyanoacrylate composition having a cure indicator. The composition includes a cyanoacrylate component; and a dye dissolved in the cyanoacrylate component to provide a solution having a first color, where upon curing of the cyanoacrylate component, the resultant cured composition has a second color.

In a second aspect, the present invention is directed to a cyanoacrylate composition. The composition includes a cyanoacrylate component; a member selected from the group consisting of accelerators, fillers, opacifiers, thickeners, viscosity modifiers, inhibitors, thixotropy conferring agents, and combinations thereof; and a fluorescent dye in an amount of about 100 to 400 ppm based on an amount of the cyanoacrylate component which imparts a first non-fluorescent color to the cyanoacrylate component. The fluorescent dye is selected from fluorescein, dibromofluorescein, diiodofluorescein, tetrabromofluorescein, tetrabromotetrachlorofluorescein, and combinations thereof. Upon curing, the cured composition exhibits a fluorescent color.

In a third aspect, the present invention is directed to a method of making a cyanoacrylate composition having a cure indicator. The method includes the steps of providing a cyanoacrylate component; providing a dye; substantially dissolving the dye in the cyanoacrylate component to form a cyanoacrylate component having a first color; and curing the cyanoacrylate component to form a cured composition having a second color.

In a fourth aspect, the present invention is directed to a method of curing a polymeric composition. This method includes the steps of providing a cyanoacrylate component; providing a cure indicator; dissolving the cure indicator in the cyanoacrylate component to form a visually color-less solution; exposing the visually color-less solution to conditions appropriate to effect cure; and detecting fluorescence of the cure indicator as an indication of substantial cure.

In a fifth aspect, the present invention is directed to a method of detecting cure of an adhesive. The detection method includes the steps of providing a first article and a second article; providing, on a surface of the first article, an adhesive; contacting a surface of the second article to the surface of the first article having the adhesive thereon; exposing the first and second articles to conditions appropriate to effect cure; and detecting fluorescence of the cured adhesive. The adhesive, in its uncured state, includes a visually colorless solution of a cyanoacrylate component and a dye.

Preferably, in the present invention, the fluorescent dye is selected from fluorescein, dibromofluorescein, diiodofluorescein, tetrabromofluorescein, and tetrabromotetrachlorofluorescein. Preferably, the dyes are present in an amount sufficient to impart observable color when the composition is cured, preferably about 50 to about 1000 ppm, and more preferably, about 100 to about 400 ppm based on an amount of the cyanoacrylate monomer.

DETAILED DESCRIPTION OF THE INVENTION

The present invention is directed to a cyanoacrylate composition, having a cure indicator. That is, the cyanoacrylate composition is "self-indicating" with respect to its ability to allow the end user to visually inspect the composition to determine whether, and the extent to which, cure has occurred. The composition includes a cyanoacrylate component, and a dye dissolved in the cyanoacrylate component. The cyanoacrylate composition has an initial color, oftentimes colorless or substantially so to the naked eye, and when cured, the cured cyanoacrylate composition has a different or second color including fluorescence. Observation of the different or second color is indicative that cure has occurred and the extent of the color change can be used to determine the degree of cure that has occurred. The cured cyanoacrylate composition undergoes a color change and glows, i.e., luminesces, under black light, thereby confirming cure of the cyanoacrylate composition.

The cyanoacrylate component useful in the present invention includes cyanoacrylate monomers, such as those represented by the structure:

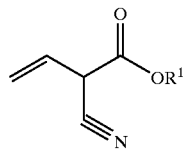

wherein $R^1$ is selected from $C_{1-16}$ alkyl, alkoxyalkyl, cycloalkyl, alkenyl, aralkyl, aryl, allyl and haloalkyl groups. Preferably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable cyanoacrylate monomer is ethyl-2-cyanoacrylate. The cyanoacrylate component should be included in the compositions in an amount within the range of about 50 wt to about 99.8 wt. %, preferably about 90 wt. % to about 98 wt. %.

The compositions of the present invention may also contain additives such as stabilizers, accelerators, fillers, opacifiers, thickeners, viscosity modifiers, inhibitors, thixotrophy conferring agents, and combinations thereof. These additives are known to those of skill in the art. The cyanoacrylate monomers are preferably stabilized using acid stabilizers of the Lewis or protonic types although combinations of nonvolatile sulfonic acids with gaseous stabilizers such as NO, $SO_2$, $SO_3$, $BF_3$, and HF can provide a synergistic effect. A preferred stabilizer system for the present invention comprises methane sulfonic acid ("MSA") and $SO_2$. Preferably, the amount of MSA is about 5 to about 25 ppm and a preferred amount of $SO_2$ is about 2 to about 30 ppm based on the amount of the cyanoacrylate monomer. More preferably, $BF_3$, another acidic gaseous stabilizer, may also be added in amounts of about 5 ppm to about 50 ppm based on the amount of the cyanoacrylate monomer. The combination of the cyanoacrylate monomer and the additives will be referred to herein as a cyanoacrylate component.

The cyanoacrylate components of the present invention are typically curable using an anionic mechanism utilizing free radical generation. The layer of moisture inherently adsorbed on the surfaces of virtually all materials is sufficient to initiate polymerization of the cyanoacrylate component. The hydroxyl groups of the water molecules effectively act to initiate polymerization as carbanions are generated at a rapid rate. The polymerization reaction will continue until all available monomer is consumed or until growth is inhibited by an acidic species.

Fluorescent dyes which are useful in the present invention are substantially soluble in and non-reactive with the cyanoacrylate component and do not adversely affect the curing properties of the monomer. Fluorescent dyes which adversely affect the storage stability of the cyanoacrylate component are undesirable as well, in particular, those fluorescent dyes having a free nitrogen render the cyanoacrylate components unstable. The preferred compositions of the present invention were found to exhibit good stability having a shelf life of greater than about 1 year at or about room temperature. Shelf life was determined by heating the compositions in glass tubes at 82° C.

The dyes suitable for use in accordance with the present invention are present in an amount sufficient to impart observable color when the composition is cured, preferably about 50 to about 1000 ppm, and more preferably about 100 to about 400 ppm based on an amount of the cyanoacrylate monomer.

Those dyes classified as xanthenes and anthraquinones are preferred, particularly those which can be readily solubilized in the cyanoacrylate component in the chosen amount and do not adversely affect the curing of the monomer. Xanthenes are characterized by the following structure:

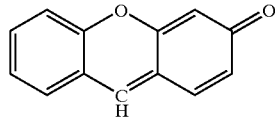

Fluorans are a preferred class of xanthene dyes suitable for use in the present invention. Particularly preferred fluorans comprise fluorescein (D&C Yellow #7), dibromofluorescein (D&C Orange #5), diiodofluorescein (D&C Orange #10), tetrabromofluorescein (D&C Red #21), and tetrabromotetrachlorofluorescein (D&C Red #27, also known as Pylam Red #27). Anthraquinone dyes are characterized by the following structure:

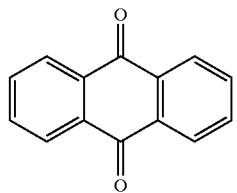

Preferred anthraquinone dyes are 7,16-dichloro-6,15-dihydro-5,9,14,18-anthrazine-tetrone (D&C Blue #9), the disodium salt of 2,2'-[(9,10-dihydro-9,10-dioxo-1,4-anthracenediyl)diimino]bis-[5-methylbenzenesulfonic acid (D&C Green #5), 1,4-bis(4'-methylanilino)anthraquinone (D&C Green #6), and 1-hydroxy-4-(4-methylanilino) anthraquinone (D&C Violet #2). D&C is the category of dyes and pigments considered safe for drugs and cosmetics when in contact with mucous membranes or when ingested, as determined by the U.S. Food and Drug Administration.

The dye is substantially dissolved in the cyanoacrylate component thereby producing a visually color-free composition, or the composition may have a faint color associated therewith. The composition is typically a liquid but its viscosity may be modified to an extent to reach a non-flowable gel depending on the amount of thickeners added to adjust the viscosity of the composition. The viscosity range of the compositions of the present invention may be from about 5 cps to a non-flowable gel. Unexpectedly, when the dye is dissolved in the cyanoacrylate component of the present invention, there is no initial fluorescence and little to no color; however, upon exposure to conditions appropriate for cure, the cured composition fluoresces, as seen under black light, and undergoes a visible color change. The visible color change may be from substantially colorless to red/pink or from fluorescent yellow/green to substantially colorless. The color change and/or change in fluorescence provides an advantageous cure indicator for the end user to readily determine without the use of sophisticated and expensive detection equipment when the adhesive has substantially cured.

The following examples describe the preparation and use of the colored cyanoacrylate compositions of the present invention. These examples are presented for the purpose of further illustrating and explaining the invention, and are not to be taken as limiting the scope of the invention.

EXAMPLES

Base Cyanoacrylate Component:

| Component | Amount |
|---|---|
| Ethyl cyanoacrylate monomer | 988.5 g |
| $SO_2$ (2000 ppm stock solution) | 6.5 g (equivalent to 15 ppm*) |
| MSA (1000 ppm stock solution) | 5.0 g (equivalent to 15 ppm*) |

*based on a weight of the ethyl cyanoacrylate monomer

Example 1

To the base cyanoacrylate component was added 200 ppm D&C Red #27. The mixture was mixed for 5 minutes at 1150 rpm using a Clay Adams Dynac II centrifuge Model 420103, available from Becton Dickinson, Sparks, Md., to form a visually clear, color-free semi-gel, a portion of which was cured on a glass slide for 18 hours at room temperature. After cure, the composition was fluorescent under black light as seen using a photoelectronic detector, SICK Detector LUT1-530, with an LED meter capable of reading 0 to 20 milliAmps (mA) at 365 nm, having a UV-A fluorescent tube. The output current was 200 mA. The solid cured composition showed a fluorescence of. 0.11 mA. Prior to full cure, about 15 minutes after the gel formulation was placed on the glass slide, as the curing mechanism was initiated there was some degree of fluorescence. The semi-gel partially cured composition showed a fluorescence of 0.03 mA.

Example 2

To the base cyanoacrylate component was added 500 ppm D&C Red #27. The mixture was centrifuged for 5 minutes at 1150 rpm to form a clear, visually color-free semi-gel, a portion of which was cured on a glass slide for 18 hours at room temperature. The solid cured composition showed a fluorescence of 0.50 mA. The semi-gel partially cured composition, about 15 minutes after the gel formulation was placed on the glass slide, showed a fluorescence of 0.24 mA.

Example 3

To the base cyanoacrylate component was added 1000 ppm D&C Red #27. The mixture was centrifuged for 5 minutes at 1150 rpm to form a clear, visually color-free semi-gel, a portion of which was cured on glass slides for 18 hours at room temperature. The solid cured composition showed a fluorescence of 0.86 mA. The semi-gel partially cured composition, about 15 minutes after the gel formulation was placed on the glass slide, showed a fluorescence of 0.48 mA.

Example 4

To the base cyanoacrylate component was added 100 ppm D&C Yellow #7. The mixture was centrifuged for 5 minutes at 1150 rpm to form a clear liquid having a faint yellow/green fluorescent color. The mixture was cured on a glass slide for 18 hours at room temperature. The cured composition showed a fluorescence of about 0.10 mA.

Example 5

A gel formulation was prepared using 176.0 g of ethyl cyanoacrylate monomer, 1.0 g of a 1000 ppm MSA stock solution, and 12.0 g of polymethylmethacrylate thickener. The mixture was heated to 48° C. and cooled to room temperature followed by addition of 1.3 g of a 2000 ppm $SO_2$ stock solution, 200 ppm D&C Red #27, and 12.0 g CAB-O-SIL™ TG 730, available from Cabot Corp. of Tuscola, Ill., a hydrophobic amorphous silica as a thickener. The color of the mixture was clear with a slight haze but color-free. The mixture had the consistency of a non-flowing gel. A portion of the gel was placed between two glass slides and cured for 2 hours at room temperature. Upon cure, the composition had a light pink color as seen through the glass slide. Under a black light, the composition exhibited fluorescence and was a glowing pink.

Examples 1 to 5 show that the compositions of the present invention provide a means for indicating substantially full cure wherein the cured composition undergoes a visual color change, as seen by the naked eye, and a change in fluorescence. Examples 1 to 3 illustrate that the fluorescence increases as the composition approached its optimum cure.. The initial fluorescence of the partially cured formulation increased significantly upon full cure. Furthermore, as the concentration of dye increased, the fluorescence increased as well.

While the present invention has been particularly described, in conjunction with a specific preferred embodiment, it is evident that many alternatives, modifications and variations will be apparent to those skilled in the art in light of the foregoing description. It is therefore contemplated that the claims embrace any such alternatives, modifications and variations as falling within the true scope and spirit of the present invention.

What is claimed is:

1. A cyanoacrylate composition having a cure indicator comprising a cyanoacrylate monomer; and a dye selected from the group consisting essentially of anthraquinone dyes and xanthene dyes dissolved in said cyanoacrylate monomer to provide a solution having a first color, wherein a resultant cured composition has a second color.

2. The composition of claim 1, wherein the first color is non-fluorescent and the second color is fluorescent.

3. The composition of claim 1, wherein said cyanoacrylate monomer comprises a monomeric structure represented by:

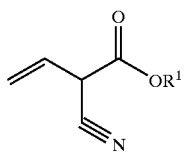

wherein $R^1$ is $C_{1-15}$ alkyl, alkoxyalkyl, cycloalkyl, alkenyl, aryl, aralkyl, allyl, alkyhalide, or haloalkyl.

4. The composition of claim 3, wherein said cyanoacrylate monomer comprises a member selected from the group consisting of methyl cyanoacrylate, ethyl-2-cyanoacrylate, propyl cyanoacrylates, butyl cyanoacrylates, octyl cyanoacrylates, allyl cyanoacrylates, β-methoxyethyl cyanoacrylate, and combinations thereof.

5. The composition of claim 1, wherein said cyanoacrylate monomer comprises ethyl-2-cyanoacrylate.

6. The composition of claim 1, wherein said xanthene dyes comprises a fluoran dye selected from the group consisting of fluorescein, dibromofluorescein, diiodofluorescein, tetrabromofluorescein, tetrabromotetrachlorofluorescein, and combinations thereof.

7. The composition of claim 1, wherein said dye is present in an amount of about 50 ppm to about 1000 ppm based on an amount of said cyanoacrylate component.

8. The composition of claim 1, wherein said dye is present in an amount of about 100 to about 400 ppm based on an amount of said cyanoacrylate component.

9. The composition of claim 1, wherein said dye is present in an amount which substantially dissolves in said cyanoacrylate component.

10. The composition of claim 1, further comprising a member selected from the group consisting of accelerators, fillers, opacifiers, thickeners, viscosity modifiers, inhibitors, thixotropy conferring agents, and combinations thereof.

11. A cyanoacrylate composition comprising
a cyanoacrylate monomer;
a member selected from the group consisting of accelerators, fillers, opacifiers, thickeners, viscosity modifiers, inhibitors, thixotropy conferring agents, and combinations thereof; and
a fluorescent dye in an amount of about 100 to 400 ppm based on an amount of said cyanoacrylate monomer which imparts a first non-fluorescent color to said cyanoacrylate monomer, said fluorescent dye selected from the group consisting of fluorescein, dibromofluorescein, diiodofluorescein, tetrabromofluorescein, tetrabromotetrachlorofluorescein, and combinations thereof,
wherein upon curing, the cyanoacrylate composition exhibits a fluorescent color.

12. The composition of claim 11, wherein said fluorescent dye comprises fluorescein.

13. A method of making a cyanoacrylate composition having a cure indicator comprising the steps of:
providing a composition of claim 1; and
curing the cyanoacrylate monomer to form a cured composition having a second color.

14. The method of claim 13, wherein prior to the step of curing, the cyanoacrylate monomer has a non-fluorescent color.

15. The method of claim 13, wherein after the step of curing, the cured composition has a fluorescent color.

16. The method of claim 13, wherein in the step of providing a dye, the dye is a fluoran dye selected from the group consisting of fluorescein, dibromofluorescein, diiodofluorescein, tetrabromofluorescein, and tetrabromotetrachlorofluorescein.

17. A method of curing a polymeric composition comprising the steps of:
providing a composition of claim 1; and
exposing the composition to conditions appropriate to effect cure; and
detecting fluorescence of the cure indicator as an indication of substantial cure.

18. The method of claim 17, wherein the step of detecting fluorescence of the cure indicator as an indication of substantial cure further includes detecting a color change in the polymeric composition.

19. A method of detecting cure of an adhesive comprising the steps of:
providing a first article and a second article;
providing, on a surface of the first article, a composition of claim 1;
contacting a surface of the second article to the surface of the first article having the composition thereon;
exposing the first and second articles to conditions appropriate to effect cure; and
detecting fluorescence of the cured composition.

20. The method of claim 19, wherein the step of detecting fluorescence of the composition further includes detecting a color change in the composition as an indication of substantially full cure.

21. The method of claim 19, wherein in the step of providing a composition, the dye is a fluoran dye selected from the group consisting of fluorescein, dibromofluorescein, diiodofluorescein, tetrabromofluorescein, and tetrabromotetrachlorofluorescein.

22. The composition of claim 5, wherein said anthraquinone dye comprises a member selected from the group consisting of 7,16-dichloro-6,15-dihydro-5,9,14,18-anthrazine-tetrone, the disodium salt of 2,2'-[(9,10-dihydro-9,10-dioxo-1,4-anthracenediyl)diimino]bis-[5-methylbenzenesulfonic acid, 1,4-bis(4'-methylanilino)anthraquinone, 1-hydroxy-4-(4-methylanilino)anthraquinone, and combinations thereof.

23. The method of claim 19, wherein in the step of providing a composition, the dye is an anthraquinone dye selected from the group consisting of 7,16-dichloro-6,15-dihydro-5,9,14,18-anthrazine-tetrone, the disodium salt of 2,2'-[(9,10-dihydro-9,10-dioxo-1,4-anthracenediyl)diimino]bis-[5-methylbenzenesulfonic acid, 1,4-bis(4'-methylanilino)anthraquinone, 1-hydroxy-4-(4-methylanilino)anthraquinone, and combinations thereof.

24. A cyanoacrylate composition comprising
a cyanoacrylate monomer;
and a fluorescent dye in an amount of about 100 to 400 ppm based on an amount of said cyanoacrylate monomer which imparts a first non-fluorescent color to said cyanoacrylate monomer, said fluorescent dye selected from the group consisting of fluorescein, dibromofluorescein, diiodofluorescein, tetrabromofluorescein, tetrabromotetrachlorofluorescein, and combinations thereof, wherein upon curing, the cyanoacrylate composition exhibits a fluorescent color.

* * * * *

UNITED STATES PATENT AND TRADEMARK OFFICE
Certificate

Patent No. 6,689,826 B2            Patented: February 10, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Stan Wojciak, New Britain, CT (US); and Shabbir Attarwala, Simsbury, CT (US).

Signed and Sealed this Thirtieth Day of May 2006.

*VASU JAGANNATHAN*
*Supervisory Patent Examiner*
Art Unit 1714

UNITED STATES PATENT AND TRADEMARK OFFICE
CERTIFICATE OF CORRECTION

| | | |
|---|---|---|
| PATENT NO. | : 6,689,826 B2 | Page 1 of 1 |
| APPLICATION NO. | : 10/050710 | |
| DATED | : February 10, 2004 | |
| INVENTOR(S) | : Stan Wojciak et al. | |

It is certified that error appears in the above-identified patent and that said Letters Patent is hereby corrected as shown below:

Col. 6, line 57 delete "essentially"

Signed and Sealed this

Eighteenth Day of July, 2006

JON W. DUDAS
*Director of the United States Patent and Trademark Office*